United States Patent
Narasimhan et al.

(10) Patent No.: US 8,305,921 B2
(45) Date of Patent: *Nov. 6, 2012

(54) CHANNEL SELECTION AND INTERFERENCE SUPPRESSION

(75) Inventors: Ravi Narasimhan, Los Altos, CA (US); Andrea Goldsmith, Menlo Park, CA (US)

(73) Assignee: Quantenna Communications, Inc., Fremont, CA (US)

(*) Notice: Subject to any disclaimer, the term of this patent is extended or adjusted under 35 U.S.C. 154(b) by 374 days.

This patent is subject to a terminal disclaimer.

(21) Appl. No.: 12/630,814

(22) Filed: Dec. 3, 2009

(65) Prior Publication Data

US 2010/0254325 A1 Oct. 7, 2010

Related U.S. Application Data

(60) Provisional application No. 61/166,690, filed on Apr. 3, 2009.

(51) Int. Cl.
- G01R 31/08 (2006.01)
- H04W 4/00 (2009.01)
- H04B 1/02 (2006.01)
- G06F 3/033 (2006.01)
- H03K 9/00 (2006.01)
- H04L 27/00 (2006.01)

(52) U.S. Cl. .......... 370/252; 370/328; 455/91; 455/130; 375/316; 375/295

(58) Field of Classification Search .......... None
See application file for complete search history.

(56) References Cited

U.S. PATENT DOCUMENTS

| | | | |
|---|---|---|---|
| 6,081,215 A | 6/2000 | Kost et al. | |
| 6,101,399 A * | 8/2000 | Raleigh et al. | 455/561 |
| 6,560,447 B2 | 5/2003 | Rahman et al. | |
| 6,606,359 B1 | 8/2003 | Nag et al. | |
| 6,888,809 B1 * | 5/2005 | Foschini et al. | 370/334 |
| 7,009,536 B1 | 3/2006 | Gaus, Jr. | |
| 7,304,597 B1 | 12/2007 | LaMarche | |
| 7,317,774 B2 | 1/2008 | Richey et al. | |
| 7,321,631 B1 | 1/2008 | Choi et al. | |
| 7,706,469 B2 * | 4/2010 | Bandemer et al. | 375/316 |
| 7,756,007 B2 * | 7/2010 | Nicoli et al. | 370/210 |
| 7,835,456 B2 | 11/2010 | Choi et al. | |
| 7,907,911 B2 * | 3/2011 | Alexiou et al. | 455/69 |
| 8,031,798 B2 * | 10/2011 | Prasad et al. | 375/285 |
| 8,233,865 B2 * | 7/2012 | Hosokawa et al. | 455/226.1 |
| 2003/0103589 A1 | 6/2003 | Nohara et al. | |
| 2003/0128141 A1 | 7/2003 | Asami | |
| 2005/0059366 A1 | 3/2005 | Choi et al. | |
| 2006/0269004 A1 | 11/2006 | Ibrahim et al. | |
| 2006/0281425 A1 | 12/2006 | Jungerman | |
| 2007/0147536 A1 * | 6/2007 | Melzer et al. | 375/267 |

(Continued)

OTHER PUBLICATIONS

Co-pending U.S. Appl. No. 12/753,807, filed Apr. 2, 2010.

(Continued)

*Primary Examiner* — Nittaya Juntima

(57) ABSTRACT

Several adaptive techniques are described to combat interference in multiple-input multiple-output (MIMO) systems. In addition to adaptive frequency selection, interference suppression techniques for a selected carrier frequency are presented. The interference suppression technique can be adaptively selected based on the availability and quality of channel state information (CSI) and interference statistics. Techniques to estimate interference statistics are also presented. Interference mitigation techniques are also presented for automatic gain control (AGC), intermittent interference, and interference caused to other networks.

22 Claims, 14 Drawing Sheets

U.S. PATENT DOCUMENTS

2007/0160156 A1* 7/2007 Melzer et al. .................. 375/260
2007/0273567 A1 11/2007 LaMarche
2009/0147890 A1* 6/2009 Lee et al. ...................... 375/341
2009/0274074 A1* 11/2009 Astely ........................... 370/280
2010/0067366 A1* 3/2010 Nicoli ............................ 370/210
2010/0255790 A1* 10/2010 Farajidana et al. ............. 455/69
2010/0273514 A1* 10/2010 Koo et al. ..................... 455/501
2011/0007839 A1 1/2011 Tang et al.
2011/0128917 A1* 6/2011 Ko et al. ....................... 370/328

OTHER PUBLICATIONS

Co-pending U.S. Appl. No. 12/754,578, filed Apr. 5, 2010.
Co-pending U.S. Appl. No. 12/705,416, filed Feb. 12, 2009.
Office Action mailed Mar. 15, 2011 from U.S. Appl. No. 12/705,416, filed Feb. 12, 2010.
Notice of Allowance mailed Jun. 3, 2011 from U.S. Appl. No. 12/705,416, filed Feb. 12, 2010.

* cited by examiner

CHANNEL SELECTION AND INTERFERENCE SUPPRESSION

CROSS-REFERENCE TO RELATED APPLICATIONS

This application claims priority to U.S. Provisional Patent Application No. 61/166,690, filed on Apr. 3, 2009, and which is incorporated by reference.

BACKGROUND

Multiple-input multiple-output (MIMO) processing has gained widespread adoption as an effective means to increase throughput and reliability. For instance, the Institute of Electrical and Electronics Engineers (IEEE) 802.11n wireless local area network (WLAN) standard combines MIMO processing with orthogonal frequency-division multiplexing (OFDM) to address the demand for reliable wireless broadband services, such as high-definition television and videoconferencing. MIMO techniques can be used either to improve robustness of the link via spatial diversity or increase data rates via spatial multiplexing. Furthermore, a combination of diversity and multiplexing techniques can be used to trade off reliability and data rate.

Most wireless systems require a receiver to estimate wireless channel response, also known as channel state information (CSI), before decoding transmitted data. The receiver typically estimates CSI using training sequences sent along with the data. In many situations, it is also possible for the transmitter to obtain CSI estimates. For instance, the IEEE 802.11n WLAN standard supports CSI feedback from the receiver to the transmitter. It is well known that the information capacity of a wireless system increases if CSI is available at the transmitter. Given CSI, a MIMO transmitter can adjust the gains and phases (i.e., weights) of each transmit antenna to steer energy in optimal directions towards the receiver. Such steering of energy is often called transmit precoding or beamforming. Transmit precoding can be used for one or more spatial data streams. A MIMO receiver can use CSI to compute the optimal weights for each receive antenna to maximize the signal quality of each data stream.

Conventional precoding techniques determine the optimal transmit antenna weights based on maximizing throughput or reliability in the presence of spatially isotropic additive white Gaussian noise (AWGN). However, in many deployment scenarios, interference is often several times stronger than the background AWGN. Interference causes significant loss of reliability and throughput for wireless systems. Many interference sources have distinct spatial, temporal, and frequency signatures. However, traditional approaches to interference mitigation, such as carrier frequency scanning and hopping, do not effectively exploit the characteristics of the interference. Furthermore, a lack of available frequencies may limit the applicability of frequency hopping.

SUMMARY

The following is described and illustrated in conjunction with systems, tools, and methods that are meant to be exemplary and illustrative, not limiting in scope. Techniques are described to address one or more of deficiencies in the state of the art.

Several adaptive techniques are described to combat interference in multiple-input multiple-output (MIMO) systems, including, in some instances, special cases of MIMO. In addition to adaptive frequency selection, interference suppression techniques for a selected carrier frequency are presented. The interference suppression technique can be adaptively selected based on the availability and quality of channel state information (CSI) and/or interference statistics. Techniques to estimate interference statistics are also presented. Interference mitigation techniques are also presented for, for example, automatic gain control (AGC), intermittent interference, etc.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. In other instances, well-known implementations or operations are not shown or described in detail to avoid obscuring aspects of the claimed subject matter.

Figure 1:
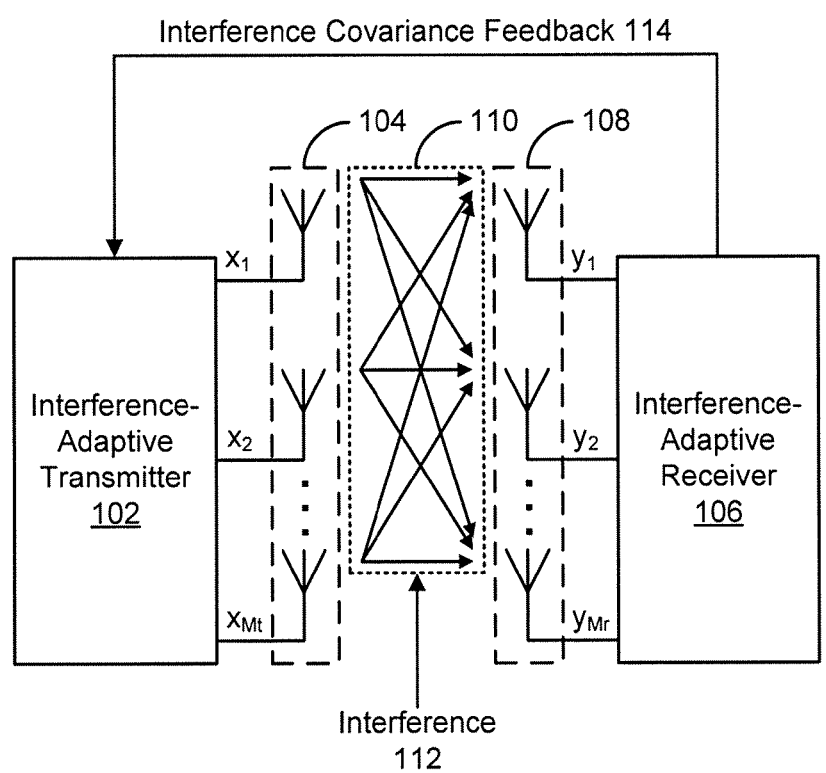
FIG. 1 depicts an example of a system with an interference-adaptive transmitter (IAT) and an interference-adaptive receiver (IAR).

FIG. 1 depicts an example of a system 100 with an interference-adaptive transmitter (IAT) and an interference-adaptive receiver (IAR). The system 100 includes an IAT 102 with a transmit (Tx) antennae array 104 and an IAR 106 with a receive (Rx) antennae array 108. The components 102, 104 can be implemented in a first station and the components 106, 108 can be implemented in a second station in a typical implementation, but the components could be implemented atypically in alternative implementations while still benefiting from the described techniques.

A station, as used in this paper, may be referred to as a device with a media access control (MAC) address and a physical layer (PHY) interface to a wireless medium that complies with the Institute of Electrical and Electronics Engineers (IEEE) 802.11 standard. In alternative embodiments, a station may comply with a different standard than IEEE 802.11, or no standard at all, may be referred to as something other than a "station," and may have different interfaces to a wireless or other medium. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents.

It should be noted that multiple-input and single-output (MISO), single-input and multiple-output (SIMO), and single-input and single-output (SISO) are special cases of MIMO. MISO is when the receiver has a single antenna. SIMO is when the transmitter has a single antenna. SISO is when neither the transmitter nor the receiver have multiple antennae. As used in this paper, techniques may be applicable to any of these special cases, depending upon whether the techniques can be used with one Tx antenna and/or one Rx antenna. Thus, the acronym MIMO could be considered to include the special cases, if applicable. The techniques may also be applicable to multi-user MIMO (MU-MIMO), cooperative MIMO (CO-MIMO), MIMO routing, OFDM-MIMO, or other MIMO technologies.

The IAT 102 is adaptive in that it can optimize weights in response to interference, as described later. The IAT 102 may be capable of precoding, spatial multiplexing, and/or diversity coding. (For illustrative simplicity, it is assumed, unless explicitly stated, that the IAT 102 includes the Tx antennae array 104. Thus, the IAT 102 can be referred to as capable of functionality that requires the use of antennae.) Spatial multiplexing can be combined with precoding, e.g., when the channel is known at the transmitter or combined with diversity coding, e.g., when decoding reliability is in trade-off.

Precoding, as used in this paper, is used in conjunction with multi-stream transmission in MIMO radio systems. In precoding, the multiple streams of the signals are emitted from the transmit antennas with independent and appropriate weighting per each antenna such that some performance metric such as the link throughput is maximized at the receiver output. Note that precoding may or may not require knowledge of channel state information (CSI) at the transmitter. For example, the weights are optimized using CSI to maximize a given performance metric, a receiver might send back weights rather than CSI, antennae could be weighted equally without regard for CSI, etc. Some benefits of precoding include increasing signal gain on one or more streams through diversity combining, reducing delay spread on one or more streams, providing unequal signal-to-noise ratio (SNR) per stream for different quality of service (QoS).

Beamforming, as used in this paper, is a special case of precoding for a single-stream so that the same signal is emitted from each of the transmit antennas with appropriate weighting such that some performance metric such as the signal power is maximized at the receiver output. Some benefits of beamforming include increasing signal gain through diversity combining and reducing delay spread.

A MIMO antennae configuration can be used for spatial multiplexing. In spatial multiplexing, a high rate signal is split into multiple lower rate streams, which are mapped onto the Tx antennae array. If these signals arrive at an Rx antennae array with sufficiently different spatial signatures, the receiver can separate the streams, creating parallel channels. Spatial multiplexing can be used to increase channel capacity. The maximum number of spatial streams is limited by the lesser of the number of antennae at the transmitter and the number of antennae at the receiver. Spatial multiplexing can be used with or without transmit channel knowledge.

In the example of FIG. 1, the Tx antennae array 104 is operationally connected to the IAT 102. Generally as used in this paper, an antennae array includes multiple antennae coupled to a common source or load to produce a directive radiation pattern. The spatial relationship can contribute to the directivity of the antennae.

In the example of FIG. 1, in operation, the Tx antennae array 104 has $x_k$ as input. The value of k varies from 1 to $M_t$, where $M_t$ is the number of antennae in the Tx antennae array 104. It may be noted that the Tx antennae array 104 may or may not also act as an Rx antennae array under certain circumstances that depend upon the implementation, configuration, and environmental variables. For example, the IAT 102 could act as a transceiver, alternating use of the Tx antennae array 104 as Tx antennae with use of the antennae array as Rx antennae. Thus, in the example of FIG. 1, the Tx designation could simply represent a current use of the antennae array for transmission. It may also be noted that in an alternative embodiment, an array could contemporaneously have a first subset of antennae acting as Tx antennae and a second subset of antennae acting as Rx antennae (not shown).

In the example of FIG. 1, the IAR 106 is adaptive in that it can optimize weights in response to interference, as described later. In the example of FIG. 1, the Rx antennae array 108 is operationally connected to the IAR 106. For illustrative simplicity, it is assumed, unless explicitly stated, that the IAR 106 includes the Rx antennae array 108. Thus, the IAR 106 can be referred to as capable of functionality that requires the use of antennae.

In the example of FIG. 1, in operation, the $x_k$ signals are transmitted over the MIMO channel 110 in $N_s$ independent spatial streams. Interference 112 can be introduced into the MIMO channel 110. Interference can come from a variety of different sources including, by way of example but not limitation, a wireless station (e.g., an access point (AP) or non-AP wireless station) or, more generally, any applicable wireless transmitter.

In the example of FIG. 1, the Rx antennae array 108 has $y_k$ as input signals. The input signals include the interference 112 introduced into the MIMO channel 110. The value of k (as a subscript of y) varies from 1 to $M_r$, where $M_r$ is the number of antennae in the Rx antennae array 108. It may be noted that the Rx antennae array 108 may or may not also act as a Tx antennae array under certain circumstances that depend upon the implementation, configuration, and environmental variables. For example, the IAR 106 could act as a transceiver, alternating use of the Rx antennae array 108 as Rx antennae with use of the antennae array as Tx antennae. Thus, in the example of FIG. 1, the Rx designation could simply represent a current use of the antennae array for transmission. It may also be noted that in an alternative embodiment, an array could contemporaneously have a first subset of antennae acting as Tx antennae and a second subset of antennae acting as Rx antennae (not shown).

In the example of FIG. 1, in operation, the IAR 106 provides interference covariance feedback 114 to the IAT 102. Advantageously, the availability and quality of CSI and interference statistics enable the IAT 102 to adapt transmit precoding. The IAT 102 can use the estimates (and optionally their qualities) to compute a precoder for interference suppression at the IAT 102. The IAT 102 can compute optimal precoding using the effective channel matrix.

Optimality can be defined with respect to a selected performance objective subject to relevant constraints, such as to optimize video streaming. Examples of performance objectives for MIMO systems include by way of example but not limitation maximizing the signal-to-interference-plus-noise ratio (SINR) of the weakest stream and equalizing the SINR for all streams. For MIMO-OFDM systems, performance objectives include by way of example but not limitation maximizing the minimum SINR across all spatial streams and active OFDM subcarriers, equalizing the SINR for all streams and active subcarriers, maximizing the geometric-mean SINR across active subcarriers of the weakest stream, and maximizing the exponential effective SNR mapping (EESM) of the weakest stream. Examples of constraints include by way of example but not limitation a per-antenna transmit power constraint, a total transmit power constraint summed across all antennae, an implementation complexity constraint, and a latency constraint.

In the example of FIG. 1, in operation, the IAT 102 uses the precoder to transmit data to the IAR 106. Similar to transmit precoding, the availability and quality of CSI and interference statistics can enable adaptation of IAR 106 processing. Using the channel and interference covariance estimates (and optionally their qualities) the IAR 106 determines optimal processing for interference suppression at the IAR 106.

Figure 2:
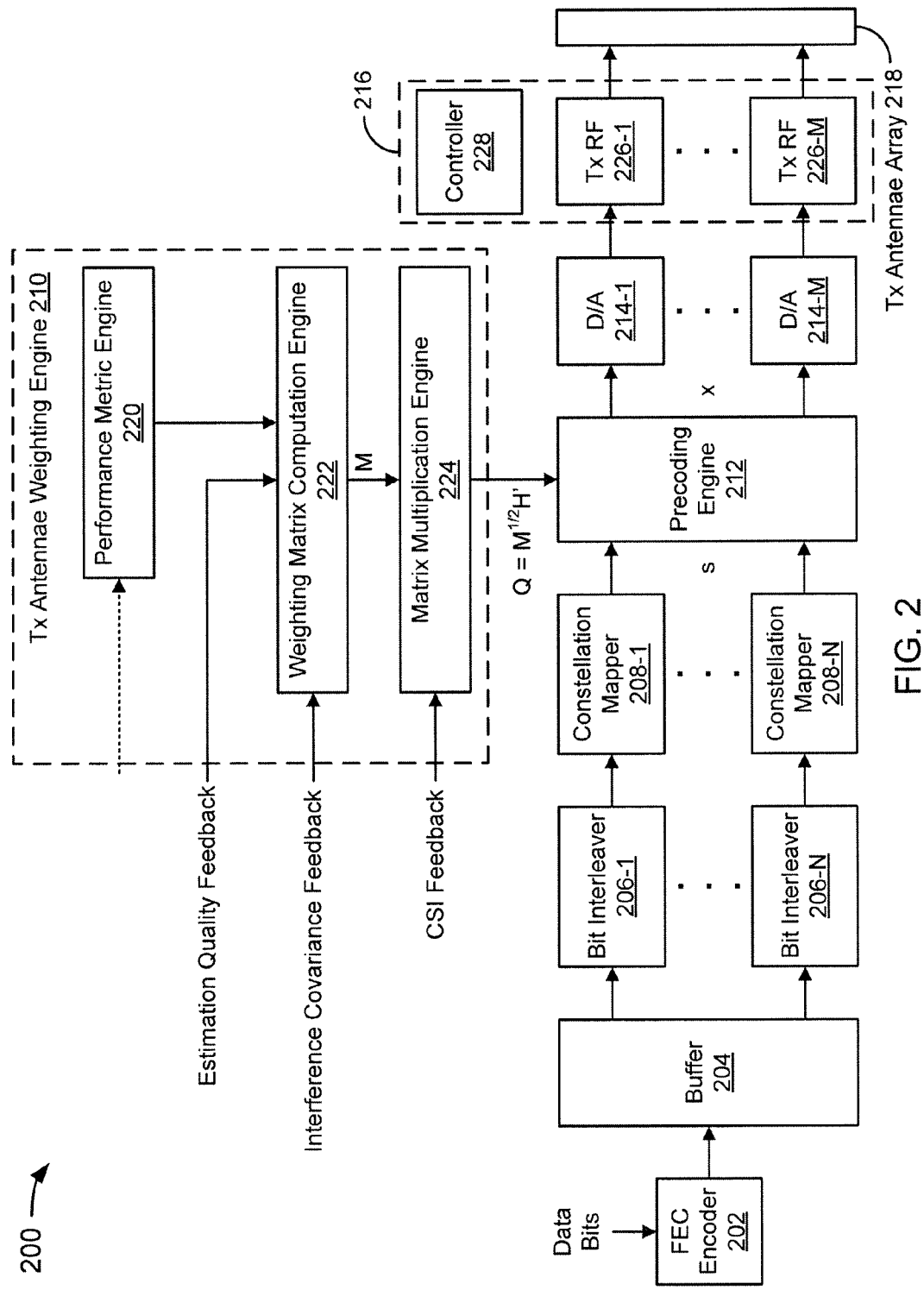
FIG. 2 depicts an example of a device suitable for use as an IAT.

FIG. 2 depicts an example of a device 200 suitable for use as the IAT 102 of FIG. 1. The device 200 includes a forward error correction (FEC) encoder 202, a buffer 204, bit interleavers 206-1 to 206-N (referred to collectively as bit interleavers 206), constellation mappers 208-1 to 208 N (referred to collectively as constellation mappers 208), a Tx antennae weighting engine 210, a precoding engine 212, digital-to-analog (D/A) converters 214-1 to 214-M (referred to collectively as D/A converters 214), a radio frequency (RF) module 216, and Tx antennae array 218.

In the example of FIG. 2, data bits are encoded at the FEC encoder 202. An FEC encoder is provided in this example because it is a typical device to encode bits in applications such as this. This component, and other components of the example of FIG. 2, could be replaced with alternative components that are capable of providing a signal associated with data bits to the Tx antennae array 218 for transmission onto a MIMO channel with appropriate weights.

In the example of FIG. 2, the coded bits are demultiplexed into $N_s$ independent spatial streams and stored in the buffer 204. It is conceivable that a system could be implemented in which the spatial streams are provided without storage in a buffer, or with a plurality of buffers.

In the example of FIG. 2, the spatial streams are bit-interleaved by the bit interleavers 206. The number of bit interleavers will typically correspond to the number of spatial streams, though it is conceivable that a system could have more (perhaps unused) or fewer (though this would be of dubious value using state of the art techniques) bit interleavers.

In the example of FIG. 2, the interleaved bits are mapped to constellation symbols (such as quadrature amplitude modulation) at the constellation mappers 208. The number of constellation mappers will typically correspond to the number of spatial streams, though it is conceivable that a system could have more (perhaps unused) or fewer (though this would be of dubious value using state of the art techniques) constellation mappers. The constellation symbols are collected to form the $N_s \times 1$ constellation vector s.

In the example of FIG. 2, CSI and interference feedback from a receiver are provided to the Tx antennae weighting engine 210. In the example of FIG. 2, the Tx antennae weighting engine 210 includes a performance metric engine 220, a weighting matrix computation engine 222, and a matrix multiplication engine 224. The Tx antennae weighting engine 210 generates a $M_t \times N_s$ precoding matrix Q. In general, the precoding matrix Q may or may not use CSI fed back from receiver. If both CSI and an interference covariance matrix are available, an effective channel matrix can be computed as a noise-whitening matrix multiplied by the original channel matrix. The noise-whitening matrix may be, by way of example, the matrix square root of the inverse of the interference covariance matrix. If an interference covariance matrix is not available or if the quality of the covariance estimate is poor, the effective channel matrix can be the original channel matrix.

In the example of FIG. 2, the performance metric engine 220 could receive raw data from which a performance metric is calculated. Preferably, the calculation would yield the same result as a corresponding calculation on a receiver. Alternatively, the performance metric engine 220 could receive a weighting matrix M as feedback from the receiver or through some other means, which would be provided (and passed through) the weighting matrix computation engine 222. Alternatively, the performance metric engine 220 could receive some other value that is useful in computing the weighting matrix M.

The weighting matrix computation engine 222 receives a performance metric from the performance metric engine 220, interference covariance feedback from the receiver, and optionally estimation quality feedback from the receiver. (Estimation quality feedback is provided for robustly adaptive transmitter implementations.) These values are used to compute the weighting matrix M. Alternatively, the performance metric engine 220 could provide the weighting matrix M, obviating the need for some other forms of feedback. It may be noted that estimation quality feedback and/or interference covariance feedback could be of lower quality than estimation quality and/or interference covariance determined at a receiver due to feedback bandwidth constraints. The weighting matrix M can be computed in accordance with the following criteria.

Suppose the channel matrix for frequency-flat fading can be written as H=H'+HΔ, where H' and HΔ are the channel estimate and estimation error, respectively. The error statistic $E[vec(H\Delta)vec(H\Delta)^H] = \sigma_H^2 I_{M_rM_t}$ is assumed to be known when channel estimation quality information is available. Here, vec(·) denotes the vectorization operation, $\sigma_H^2$ is the variance of the channel estimation error, and $I_{M_rM_t}$ is the $(M_rM_t) \times (M_rM_t)$ identity matrix. Sources of estimation error include limited estimation time, finite preamble power, channel and interference time variation, finite precision samples, and RF circuit distortions.

Now let the true interference covariance matrix $R_{nn}$ be decomposed as follows:

$$R_{nn} = \hat{R}_{nn} + R_\Delta$$

where RΔ is an error matrix satisfying $R\Delta = R_\Delta^H$. Suppose the covariance matrix estimate is unbiased such that E[RΔ]=0. Also, suppose that the estimate R'$_{nn}$ and the error statistic $\epsilon = E[R_\Delta^2]$ are known, which occurs when covariance estimation quality information is available. Define a $M_r \times M_r$ noise-whitening matrix (antennae weighting matrix) $M^{1/2}$ that is computed for interference suppression. A design criterion for the matrix $M = M^{1/2}(M^{1/2})^H$ is that the effective interference-plus-noise vector $n' = M^{1/2}n$ have a spatial covariance that is closest (in Frobenius norm) to the identity matrix. In other words, the resulting vector n' is nearly spatially "white." Under this criterion, the solution for M is $$M = (\hat{R}_{nn}^2 + \epsilon)^{-1} \hat{R}_{nn}.$$

Another design criterion for M is to minimize the Frobenius norm of the covariance of the effective interference-plus-noise vector n' subject to a minimum Frobenius norm constraint on $M^{1/2}$. With this criterion, the solution for M is:

$$M = \frac{K}{tr\left[\left(\hat{R}_{nn} + \varepsilon\right)^{-1}\right]} \left(\hat{R}_{nn} + \varepsilon\right)^{-1}$$

where tr(·) denotes the trace operator and K is the squared Frobenius norm constraint on $M^{1/2}$. Note that the equation provides a continuum of solutions depending on the quality of the interference covariance estimate. In particular, for a perfect covariance estimate (i.e., $R'_{nn} = R_{nn}$ and $\epsilon = 0_{M_r}$, where $0_{M_r}$ is the $M_r \times M_r$ matrix of all zeros), $M\alpha R_{nn}-1$. At the other extreme, when no covariance estimate is available (i.e., $R'_{nn} = I_{M_r}$), the error is spatially white (i.e., $\epsilon = \sigma_\epsilon^2 I_{M_r}$, where $\sigma_\epsilon^2 > 0$) and $M\alpha I_{M_r}$, which is equivalent to applying no noise-whitening matrix.

A third design criterion for M is to use a threshold on the covariance estimation error $\epsilon$. For instance, $$M = \begin{cases} g(\hat{R}_{nn}, \varepsilon), & \|\varepsilon\|_F^2 < \tau \\ I_{M_r}, & \text{otherwise} \end{cases}$$

where $g(R'_{nn}, \epsilon)$ is any suitable function of the interference covariance estimate $R'_{nn}$ and estimation error $\epsilon$, $\|\cdot\|_F$ denotes the Frobenious norm and $\tau$ is a programmable threshold. Such a threshold-based design criterion would include situations where the interference covariance estimate is available, although the quality of the estimate is poor. In such scenarios, the transmitter and/or receiver may decide to ignore the interference covariance estimate; however, the quality of the estimate at the transmitter is poor, while the quality of the estimate at the receiver is good. In this example, the transmitter would ignore its interference covariance estimate by setting the threshold $\tau$ sufficiently low. Interference suppression would then occur only at the receiver. In this fashion, the interference suppression method adapts to the quality of the covariance estimate.

In the example of FIG. 2, the matrix multiplication engine 224 combines the weighting matrix M from the weighting matrix computation engine 222 and CSI feedback from a receiver to generate a modified channel estimate, or precoding matrix Q. The CSI feedback may include an "original" channel estimate H' or H' could be derived from the CSI feedback. Q could be computed as $Q = M^{1/2} H'$. However, in an alternative, M and H' could be combined in some other manner to obtain Q.

In the example of FIG. 2, the constellation vector s and the precoding matrix Q are passed to the precoding engine 212. In this example, the precoding engine generates an $M_t \times 1$ transmitted vector x, where x=Qs. Alternatively, the constellation vector s and the precoding matrix Q could be combined in some other manner.

In the example of FIG. 2, the digital vector x is converted to analog waveforms at the D/A converters 214. The number of D/A converters 214 will typically correspond to the number of Tx antennae in the Tx antennae array 218, though it is conceivable that a system could have more or fewer D/A converters.

In the example of FIG. 2, the analog waveforms are upconverted to the desired carrier frequency at the RF module 216. The RF module 216 includes Tx radio frequency (RF) chains 226-1 to 226-M (referred to collectively as Tx RF chains 226) and a controller 228. The analog waveforms are provided through the Tx RF chains 226 (the number of Tx RF chains 226 will typically correspond to the number of Tx antennae in the Tx antennae array 218) to the Tx antennae array 218 for transmission. The Tx RF chains 226 are part of a circuit that includes the controller 228, which is capable of tuning to a desired carrier frequency.

Advantageously, the Tx antennae weighting engine 210 enables the precoding engine 212 to compute x in a manner that is adaptive to interference on a MIMO channel.

Figure 3:
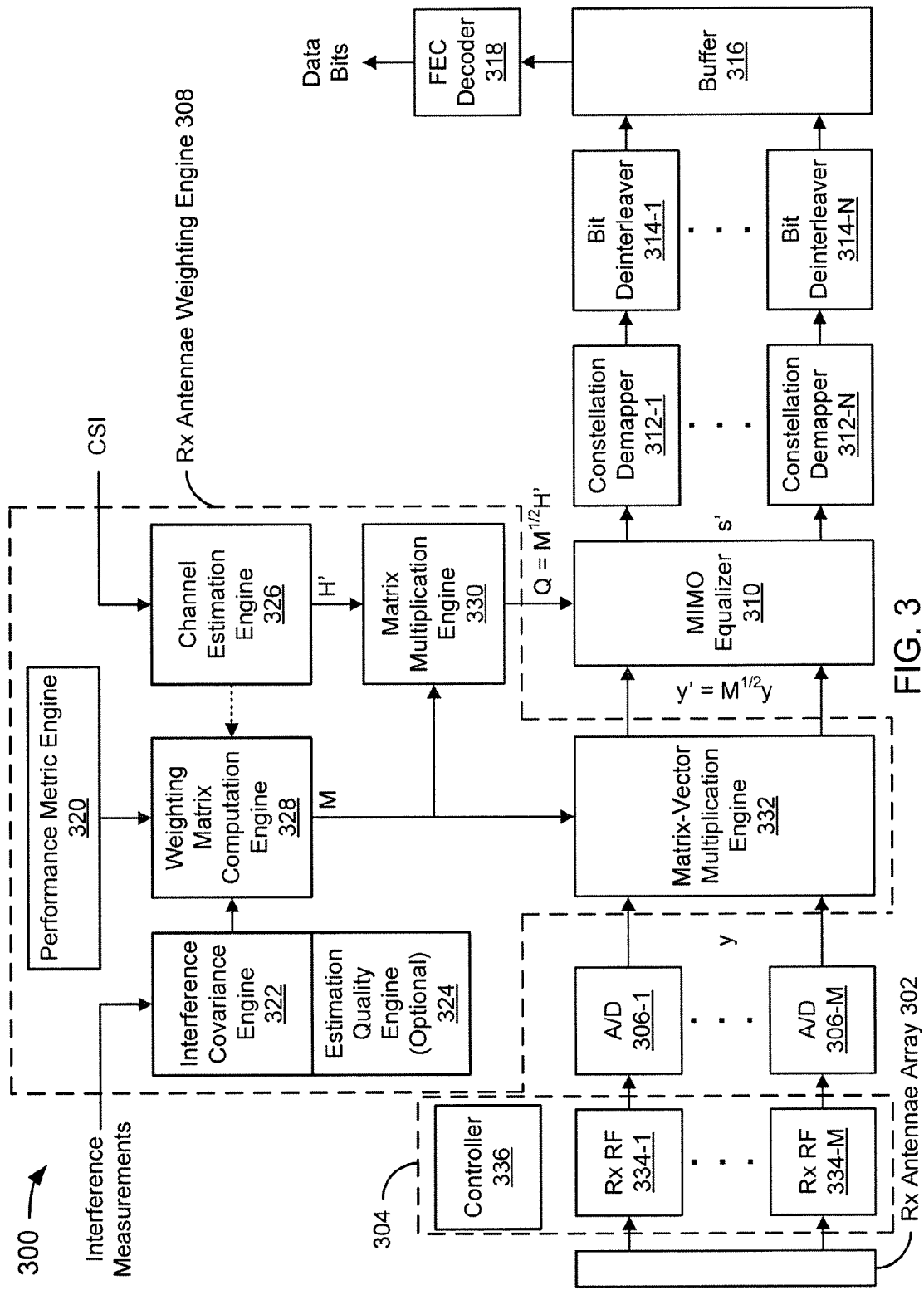
FIG. 3 depicts an example of a device suitable for use as an IAR.

FIG. 3 depicts an example of a device 300 suitable for use as the IAR 106 of FIG. 1. The device 300 includes an Rx antennae array 302, an RF module 304, analog-to-digital (A/D) converters 306-1 to 306-M (referred to collectively as the A/D converters 306), an Rx antennae weighting engine 308, a MIMO equalizer 310, constellation demappers 312-1 to 312-N (referred to collectively as the constellation demappers 312), bit deinterleavers 314-1 to 314-N (referred to collectively as the bit deinterleavers 314), a buffer 316, and an FEC decoder 318.

In the example of FIG. 3, signals are collected by the Rx antennae array 302, downconverted to baseband at the RF module 304. The RF module 304 includes Rx RF chains 334-1 to 334-M (referred to collectively as the Rx RF chains 334) and a controller 336. The Rx RF chains 334 are part of a circuit that includes the controller 336, which is capable of tuning to a desired carrier frequency.

In the example of FIG. 3, the analog baseband waveforms are digitized at the A/D converters 306 to produce an $M_r \times 1$ digital received vector y. For frequency-flat fading, y can be written as:

$$y = \gamma^{1/2} Hx + y_I + w$$

where $\gamma$ is the scalar power gain between the transmitter and the receiver, H is the $M_r \times M_t$ channel matrix normalized such that $E[|H|^2_{p,q}] = 1$ ($1 \leq p \leq M_r$, $1 \leq q \leq M_t$), $y_I$ is a $M_r \times 1$ zero-mean interference vector and w is a $M_r \times 1$ zero-mean additive white Gaussian noise vector. Let $n = y_I + w$ denote the $M_r \times 1$ zero-mean interference-plus-noise vector, $E[\cdot]$ denote expectation, and the superscript $^H$ denote conjugate transpose. Define the $M_r \times M_r$ matrix $R_{nn} = E[nn^H]$. For brevity, $R_{nn}$ is called the "interference covariance matrix," rather than the "interference-plus-noise covariance matrix." The technology discussed here addresses MIMO interference suppression based on estimates of the interference covariance matrix.

In the example of FIG. 3, the A/D converters 306 provide vector y to the Rx antennae weighting engine 308. The Rx antennae weighting engine 308 also receives interference measurements and channel estimates.

In the example of FIG. 3, the Rx antennae weighting engine 308 includes a performance metric engine 320, an interference covariance engine 322, an estimation quality engine 324, a weighting matrix computation engine 326, a channel estimation engine 328, a matrix multiplication engine 330, and a matrix-vector multiplication engine 332.

The performance metric engine 320 includes a computer-readable storage medium that enables the computation and at least temporary storage of one or more performance metrics. It may be desirable to compute a performance metric multiple times. For example, the performance metric engine 320, depending upon the implementation or configuration could compute a performance metric for each of a plurality of carrier frequencies. When an optimal carrier frequency is found, the performance metric engine 320 may or may not discard the performance metrics associated with the other carrier frequencies. The output of the performance metric engine 320 is a performance metric.

The interference covariance engine 322 includes the optional estimation quality engine 324. By providing an estimation quality value, the estimation quality engine 324 can enable an associated receiver to operate in a robust manner. Thus, where the qualities of the estimates are computed, adaptive components can be referred to as "robustly adaptive." For the sake of brevity, the interference covariance engine 322 and the estimation quality engine 324 are referred to collectively as the interference covariance engine 322 instead of separately or as "an interference covariance and estimation quality engine." Interference measurements are provided to the interference covariance engine 322; the output of the interference covariance engine 322 is an interference covariance metric.

The channel estimation engine 326 receives CSI as input; the output of the channel estimation engine 326 is an "original" channel estimate H'. Channel estimates can be obtained, for example, during specified "preamble" sections of transmitted signals. These preambles can contain training sequences that enable the device 300 (or other devices) to estimate the channel matrix of a MIMO system. Interference is typically asynchronous with data symbol boundaries and may be caused by a variety of sources, such as by way of example but not limitation other wireless networks, garage door openers, and cordless telephones. Moreover, the interference can appear in bursts as a function of time. Because of these characteristics, it is often difficult to decode the interference. However, in some scenarios the interference statistics can be stationary within a certain time interval. Estimates of the interference statistics can improve transmit precoding and receiver processing in MIMO systems by concentrating useful signal energy towards the receiver while simultaneously attenuating the interference coming from the estimated directions. Interference statistics can be estimated during observation intervals (e.g., idle intervals) at which a device is neither receiving nor transmitting useful data. During these observation intervals, the received signals at each antenna are processed to obtain an estimate of the interference covariance matrix. Averaging over multiple observation intervals can be used to improve the quality of the estimates.

In wireless networks using random access protocols, such as wireless local area networks (WLANs) using carrier sense multiple access, interference mitigation for an automatic gain control (AGC) portion of a receiver is of significant interest. As stated above, covariance estimates can be obtained during idle intervals. However, strong interference can trigger the AGC to adjust the receive analog gain and start the receiver state machine. While the receiver is processing data (i.e., not during an idle interval), interference covariance estimates would not be obtained. Once the receiver determines that the AGC was triggered on interference rather than on a valid signal, the AGC and receiver state machine can be reset to the idle state. If the strong interference is still present, the AGC could trigger again. Repeated triggering of the AGC on interference reduces the throughput of the network. Furthermore, repeated AGC triggering may cause idle intervals not to occur at a sufficient rate to obtain reliable estimates of the interference statistics. In an embodiment, a method to avoid this situation is presented. First, the receiver determines quickly whether a valid packet is received. If it is determined that the AGC triggered on the interference, interference characterization would take place, rather than resetting the AGC and receiver immediately to the idle state. This interference characterization can include covariance matrix estimation. The AGC and receiver can then be reset after allowing sufficient time for estimating the interference covariance matrix. Using receiver feedback of these estimates, the transmitter can suppress the interference experienced by the receiver.

Interference could be caused by, by way of example but not limitation, other packet-based wireless networks or switching on and off a microwave oven. In such environments, the transmitter and/or receiver can always suppress the interference if the duty cycle of the interference exceeds a threshold. This interference suppression method provides robustness to intermittent interference. The duty cycle of the interference can be estimated, for instance, by collecting statistics of AGC trigger events caused by interference. The transmitter and/or receiver can estimate interference covariance matrix only when the interference is present (e.g., after the AGC has triggered on interference) such that spatial nulls are constantly placed in the directions of the intermittent interference.

An embodiment addresses the situation where the estimation error statistics are known for the channel and/or the interference covariance matrices. For instance, the estimation error of a stationary quantity (such as the channel or interference covariance matrix) is inversely proportional to the duration of the estimation interval. In this situation, the precoding and noise-whitening matrices can be modified to account for the quality of the estimates.

The weighting matrix computation engine 328 takes the performance metric from the performance metric engine 320 and the interference covariance metric from the interference covariance engine 322 and uses the input to compute a weighting matrix M. The weighting matrix M can be used to apply different weights to antennae according to different criteria. In some implementations, the weighting matrix computation engine 328 could make use of output from the channel estimation engine 326. The input to the weighting matrix computation engine 328 from the channel estimation engine 326 is depicted as a dotted line to represent that the input is optional.

The matrix multiplication engine 330 receives the weighting matrix M from the weighting matrix computation engine 328 and the original channel estimate H' from the channel estimation engine 326 and generates a modified channel estimate. In this example, $Q=M^{1/2}H'$. In an alternative embodiment, the matrix Q could combine M and H' in some other manner than matrix multiplication.

The matrix-vector multiplication engine 332 receives the vector y from the ND converters 306 and M from the weighting matrix computation engine 328 and generates a weighted vector y'. $y'=M^{1/2}y$. In an alternative embodiment, the weighted vector y' could combine M and y in some other manner than matrix-vector multiplication.

In the example of FIG. 3, the MIMO equalizer 310 receives the weighted vector y' from the matrix-vector multiplication engine 332 and the matrix Q from the matrix multiplication engine 330. The MIMO equalizer 310 equalizes the weighted vector y' using the modified channel estimate represented by Q to form an $N_s \times 1$ equalized vector s'.

In the example of FIG. 3, the equalized vector s' passes through the constellation demappers 312 and at the bit-deinterleavers 314, the $N_s$ data streams are multiplexed into a single stream and put in the buffer 316, and data bits are obtained by the FEC decoder 318.

Figure 4:
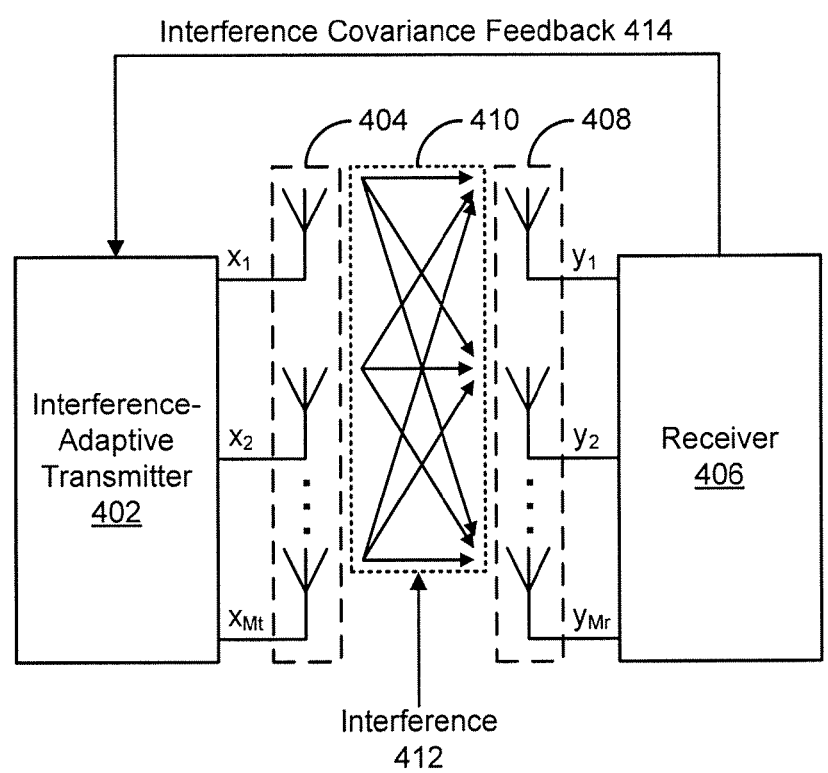
FIG. 4 depicts an example of a system that has interference suppression at an IAT.

FIG. 4 depicts an example of a system 400 that has interference suppression at an IAT. This example is intended to illustrate that an interference-adaptive system need not necessarily have interference-adaptation at the receiver. The system 400 includes an IAT 402 with a Tx antennae array 404 and a receiver 406 with a Rx antennae array 408. The Tx antennae array 404 and Rx antennae array 408 form a MIMO channel 410 between them. In operation, interference 412 is introduced onto the MIMO channel 410.

In the example of FIG. 4, in operation, a carrier frequency is selected for the system 400. Channel and spatial interference covariance matrices are estimated at the receiver 406. The qualities of the estimates are optionally computed. Where the qualities of the estimates are computed, adaptive components can be referred to as "robustly adaptive." The receiver 406 provides the interference covariance feedback 414 to the IAT 402. The IAT 402 can use the estimates (and optionally their qualities) to compute a precoder for interference suppression at the IAT 402. The IAT 402 uses the precoder to transmit data to the receiver 406. The receiver 406 computes a performance metric. The metric is stored for the given carrier frequency. Optionally, this procedure is repeated for all available carrier frequencies. The carrier frequency with the best performance metric is then selected for data communication.

Figure 5:
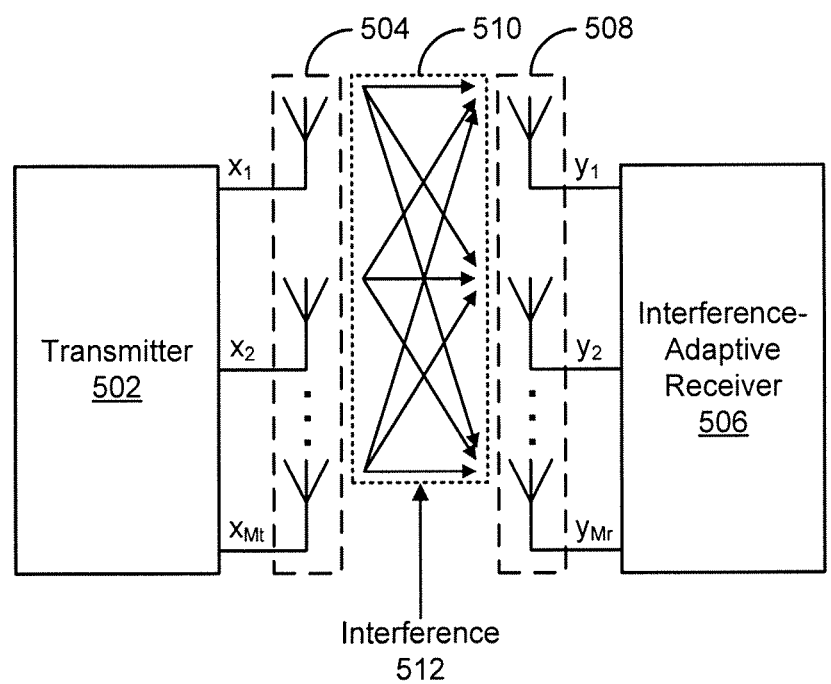
FIG. 5 depicts an example of a system that has interference suppression at an IAR.

FIG. 5 depicts an example of a system 500 that has interference suppression at an IAR. This example is intended to illustrate that an interference-adaptive system need not necessarily have interference-adaptation at the transmitter. The system 500 includes a transmitter 502 with a Tx antennae array 504 and an IAR 506 with a Rx antennae array 508. The Tx array 504 and the Rx antennae array 508 form a MIMO channel 510 between them. In operation, interference 512 is introduced onto the MIMO channel 510.

In the example of FIG. 5, in operation, a carrier frequency is selected for the system 500. Channel and spatial interference covariance matrices are estimated at the IAR 506. The qualities of the estimates are optionally computed. Where the qualities of the estimates are computed, adaptive components can be referred to as "robustly adaptive." The IAR 506 uses the estimates (and optionally their qualities) to determine the necessary MIMO processing for interference suppression at the IAR 506. The IAR 506 computes a performance metric. The metric is stored for the given carrier frequency. Optionally, this procedure is repeated for all available carrier frequencies. The carrier frequency with the best performance metric is then selected for data communication.

Figure 6:
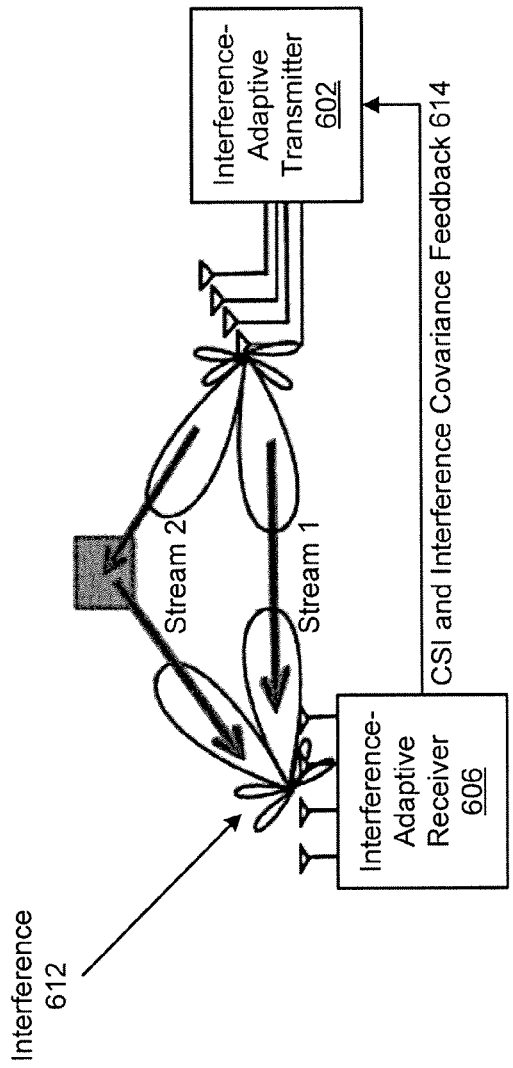
FIG. 6 depicts a conceptual diagram of spatial geometry of a system that has an IAT and an IAR.

FIG. 6 depicts a conceptual diagram of spatial geometry of a system 600 that has an IAT and an IAR. This example is intended to illustrate spatial geometry in a system such as is illustrated in the example of FIG. 1. Variations on the geometry are possible for systems that do not include an IAR (see, e.g., FIG. 4) or an IAT (see, e.g., FIG. 5). The system 600 includes an IAT 602 and an IAR 606. In operation, interference 612 is introduced and the IAR 606 provides CSI and interference covariance feedback 614 to the IAT 602.

As is shown in the example of FIG. 6, the IAT 602 directs one or more streams in a geometric pattern. In the example of FIG. 6, there are two streams, stream 1 and stream 2. The streams are formed using CSI and interference covariance feedback 614, which is received from the IAR 606. The IAR 606 directs one or more spatial streams in a geometric pattern, as well. The streams can be characterized as avoiding or going around the interference 612. This is accomplished using precoding and/or other techniques described in this paper.

In an alternative embodiment that does not include an IAR, the geometry of a receiver of the streams may have a less optimal shape (e.g., the pattern could be generally circular around the receiver). The IAT could still presumably compensate for the interference, though probably with less effectiveness than a system that includes both IAR and IAT.

In an alternative embodiment that does not include an IAT, the geometry of a transmitter of the streams may have a less optimal shape (e.g., the pattern could be generally circular around the transmitter). The IAR could still presumably compensate for the interference, though probably with less effectiveness than a system that includes both IAR and IAT.

Figure 7:
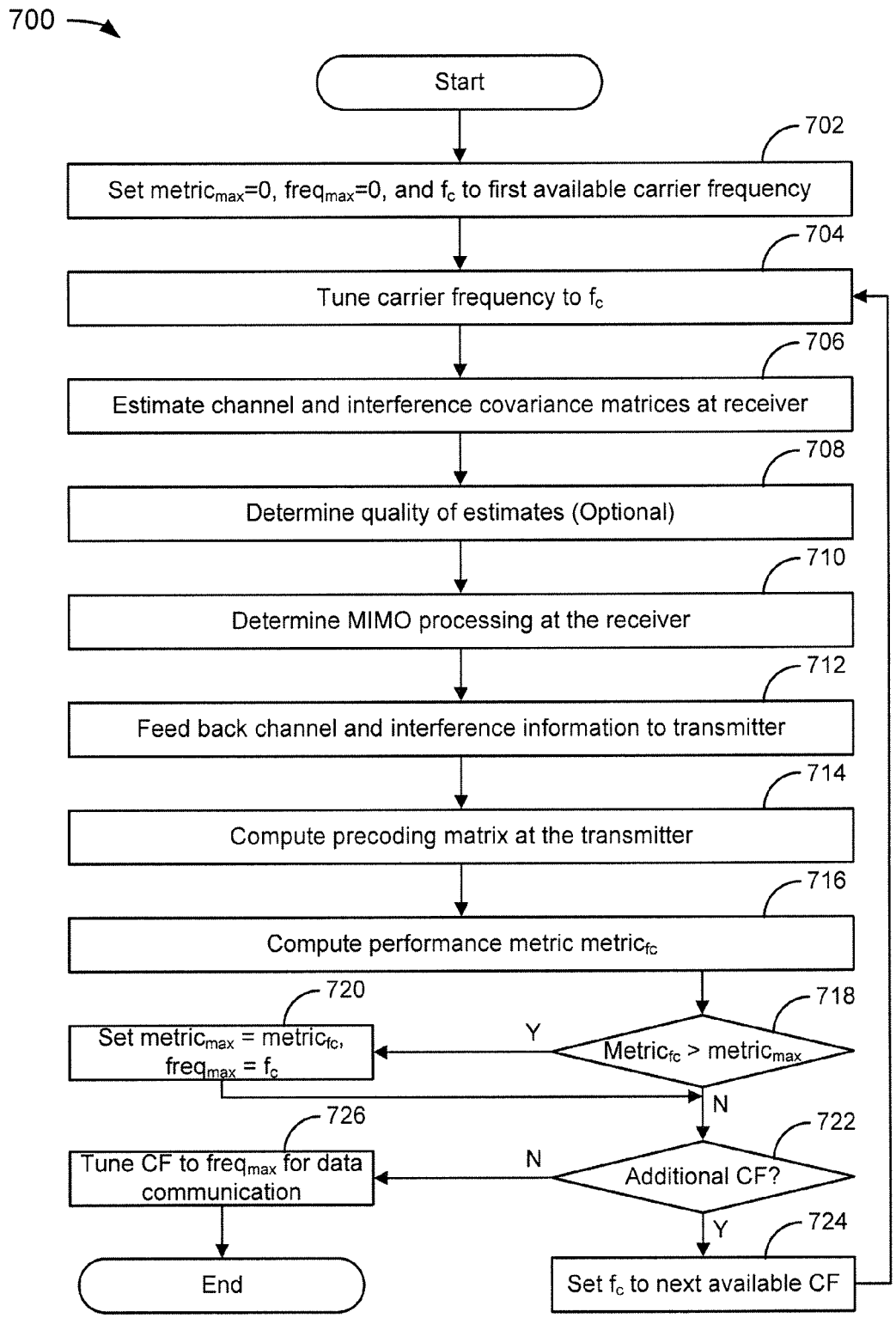
FIG. 7 depicts a flowchart of an example of a method for channel selection in a system including an IAT and an IAR.

FIG. 7 depicts a flowchart of an example of a method for channel selection in a system including an IAT and an IAR. The method could be used with a system similar to that depicted by way of example in FIG. 1. This method and other methods are depicted as serially arranged modules. However, modules of the methods may be reordered, or arranged for parallel execution as appropriate. This and other methods described in this paper can be implemented on machines such as those described by way of example with reference to FIGS. 1-6.

In the example of FIG. 7, the flowchart 700 starts at module 702 with setting metric$_{max}$=0, freq$_{max}$=0, and f$_c$ to a first available carrier frequency. The variable metric$_{max}$ is intended to represent a performance metric associated with a carrier frequency f$_c$. Preferably, when the flowchart 700 ends, metric$_{max}$ will be set to the highest performance metric over all available carrier frequencies. In this example, it is assumed that a performance metric of practically any carrier frequency will be higher than the initial value of 0, and that the higher the performance metric, the better. Of course, the variable could be used in other ways (e.g., using negative numbers and/or an initial value that is other than 0). In such a case, this initial value can be thought of as the offset value of an initial non-zero value.

The variable freq$_{max}$ is intended to represent a frequency that corresponds to the carrier frequency associated with the performance metric to which metric$_{max}$ is set. Thus, if metric$_{max}$ changes to a new, higher value, freq$_{max}$ also changes to the current carrier frequency value. Preferably, when the flowchart 700 ends, freq$_{max}$ will be set to the carrier frequency having the highest performance metric of all available carrier frequencies. The actual value of freq$_{max}$ could be a whole number representative of one of an array of carrier frequencies, a real number representative of the frequency in, e.g., MHz, or some other value that enables correlation of the freq$_{max}$ value to a carrier frequency. The initial value of 0 is intended to represent no carrier frequency association, though the freq$_{max}$ value could be initially set to f$_c$ (which would later have its performance metric calculated and stored in the metric$_{max}$ variable) or some other value that can be offset to be representative of none or one of the possible carrier frequencies. The variable f$_c$ is intended to represent a frequency or channel that is being (or will next be) evaluated. When a new metric$_{max}$ is set, freq$_{max}$ can be set to f$_c$.

In the example of FIG. 7, the flowchart 700 continues to module 704 with tuning carrier frequency to f$_c$.

In the example of FIG. 7, the flowchart 700 continues to module 706 with estimating channel and interference covariance matrices at a receiver. Channel estimates can be obtained by a receiver, for example, during specified "preamble" sections of transmitted signals. An interference covariance estimate can be obtained by a receiver during idle intervals.

In the example of FIG. 7, the flowchart 700 continues to optional module 708 with determining quality of estimates.

The module 708 is optional because not all systems will be robustly adaptive. In a robustly adaptive system, the qualities of estimates are determined.

In the example of FIG. 7, the flowchart 700 continues to module 710 with determining MIMO processing at the receiver. The receiver can use the information about the channel and interference to determine the receiver MIMO processing for interference suppression.

In the example of FIG. 7, the flowchart 700 continues to module 712 with feeding back channel and interference information to a transmitter. The receiver can provide feedback to the transmitter. The feedback can include channel, interference covariance, and optionally their qualities.

In the example of FIG. 7, the flowchart 700 continues to module 714 with computing a precoding matrix at the transmitter. The transmitter uses the feedback to determine a precoding matrix Q for use in interference suppression.

In the example of FIG. 7, the flowchart 700 continues to module 716 with computing a performance metric metric$_{fc}$. The receiver can compute the performance metric for the current carrier frequency $f_c$. Examples of performance metrics include minimum SINR across data streams, geometric-mean SINR across data streams, and bit error rate (BER) of the data streams.

In the example of FIG. 7, the flowchart 700 continues to decision point 718 where it is determined whether metric$_{fc}$ is greater than metric$_{max}$. The determination could also be greater than or equal to, but that would mean additional operations to reset variables to a metric that is equal to the last best; so it would probably be slightly less desirable. If it is determined that the metric$_{fc}$ is greater than metric$_{max}$ (718-Y), then the flowchart 700 continues to module 720 with setting metric$_{max}$ to metric$_{fc}$ and freq$_{max}$ to $f_c$.

After module 720, or if it is determined that metric$_{fc}$ is not greater than metric$_{max}$ (718-N), then the flowchart 700 continues to decision point 722 where it is determined whether additional carrier frequencies are available. If it is determined that additional carrier frequencies are available (722-Y), then the flowchart continues to module 724 where $f_c$ is set to a next available carrier frequency and the flowchart 700 returns to module 704 and continues as described previously.

If, on the other hand, it is determined that no additional carrier frequencies are available, then the flowchart 700 continues to module 726 with tuning carrier frequency to freq$_{max}$ for data communication, and the flowchart 700 ends. In this way, the system can be tuned to the carrier frequency associated with the highest calculated performance metric.

Figure 8:
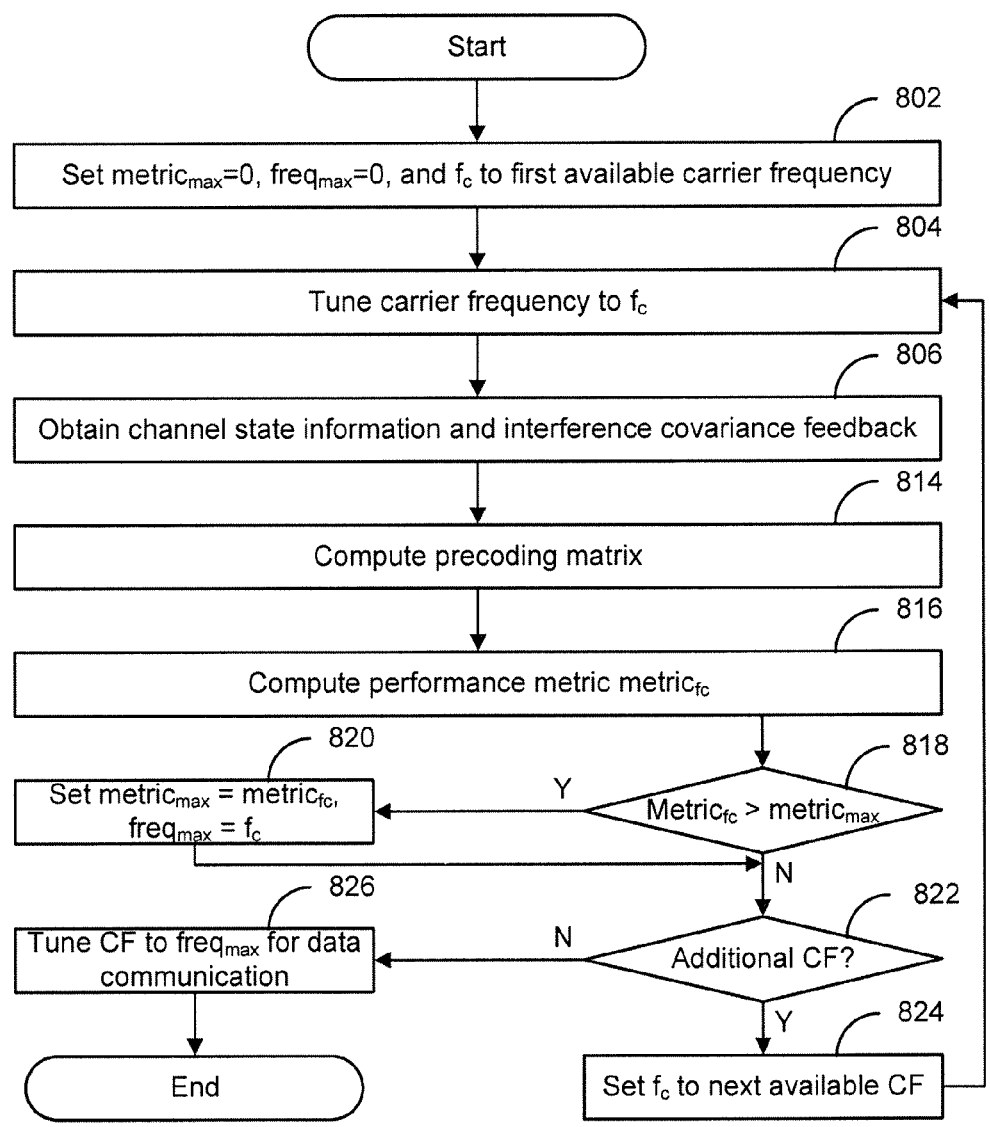
FIG. 8 depicts a flowchart of an example of a method for channel selection in a system including an IAT.

FIG. 8 depicts a flowchart 800 of an example of a method for channel selection in a system that includes an IAT. In the example of FIG. 8, the flowchart 800 starts at module 802 with setting metric$_{max}$=0, freq$_{max}$=0, and $f_c$ to a first available carrier frequency.

In the example of FIG. 8, the flowchart 800 continues to module 804 with tuning carrier frequency to $f_c$.

In the example of FIG. 8, the flowchart 800 continues to module 806 with obtaining CSI and interference covariance feedback. The CSI and interference covariance feedback can be obtained from a receiver. Channel estimates can be computed by a receiver, for example, during specified "preamble" sections of transmitted signals, and sent as CSI. An interference covariance estimate can be obtained by a receiver during idle intervals. The amount of preprocessing that occurs at the receiver is implementation-specific, but in an embodiment, the CSI includes an "original" channel estimate matrix. In some implementations, qualities of estimates can also be obtained from, e.g., the receiver. A transmitter that obtains qualities of estimates can be referred to as a robust transmitter (and an IAT can be referred to as a robustly interference-adaptive transmitter).

In the example of FIG. 8, the flowchart 800 continues to module 814 with computing a precoding matrix. The transmitter uses the CSI and interference covariance feedback to determine a precoding matrix Q for use in interference suppression. A robustly interference-adaptive transmitter also uses the estimation quality feedback for the determination.

In the example of FIG. 8, the flowchart 800 continues to module 816 with computing a performance metric metric$_{fc}$. The transmitter can compute the performance metric for the current carrier frequency $f_c$.

In the example of FIG. 8, the flowchart 800 continues to decision point 818 where it is determined whether metric$_{fc}$ is greater than metric$_{max}$. The determination could also be greater than or equal to, but that would mean additional operations to reset variables to a metric that is equal to the last best; so it would probably be slightly less desirable. If it is determined that the metric$_{fc}$ is greater than metric$_{max}$ (818-Y), then the flowchart 800 continues to module 820 with setting metric$_{max}$ to metric$_{fc}$ and freq$_{max}$ to $f_c$.

After module 820, or if it is determined that metric$_{fc}$ is not greater than metric$_{max}$ (818-N), then the flowchart 800 continues to decision point 822 where it is determined whether additional carrier frequencies are available. If it is determined that additional carrier frequencies are available (822-Y), then the flowchart continues to module 824 where $f_c$ is set to a next available carrier frequency and the flowchart 800 returns to module 804 and continues as described previously.

If, on the other hand, it is determined that no additional carrier frequencies are available, then the flowchart 800 continues to module 826 with tuning carrier frequency to freq$_{max}$ for data communication, and the flowchart 800 ends. In this way, the system can be tuned to the carrier frequency associated with the highest calculated performance metric.

Figure 9:
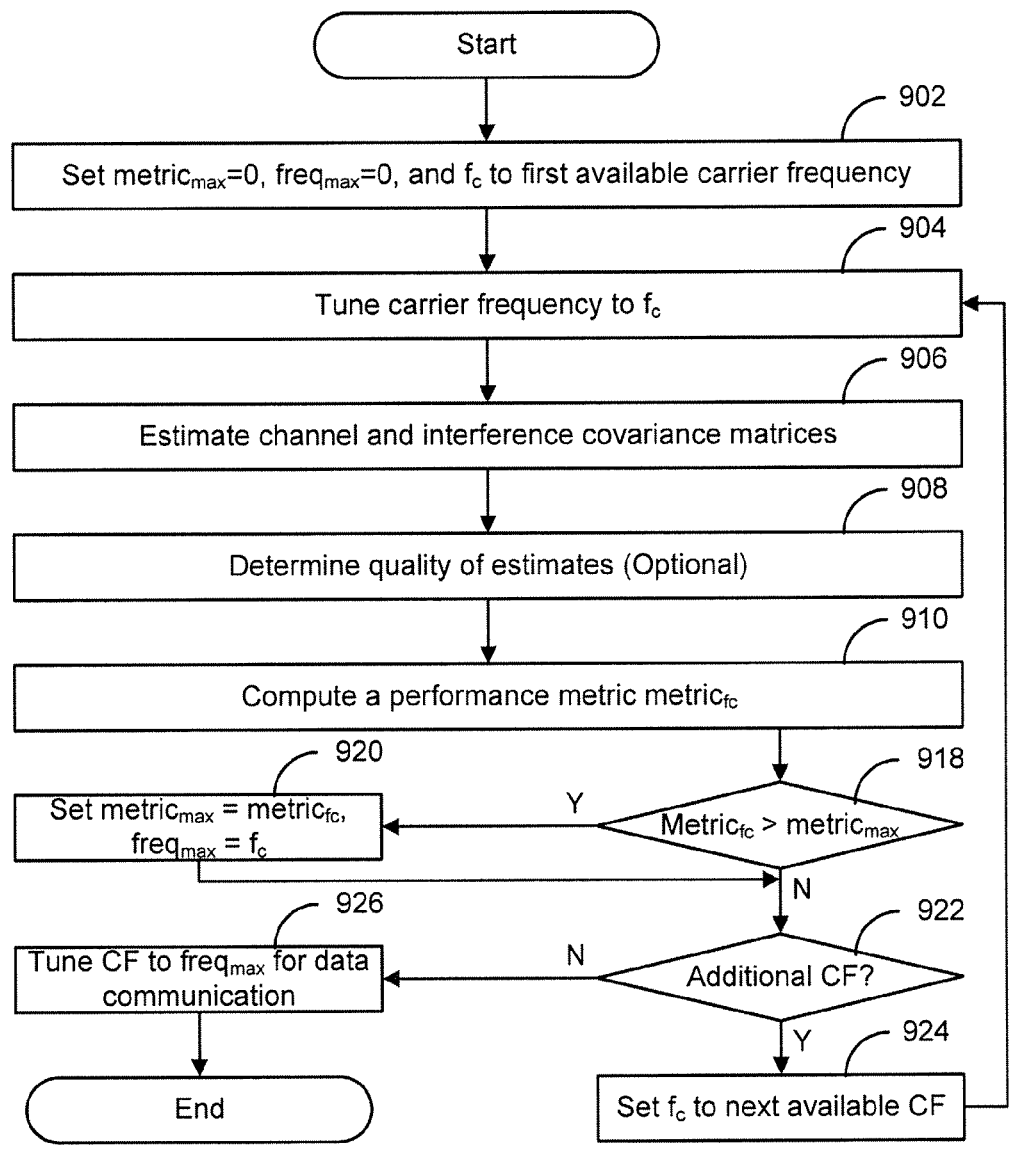
FIG. 9 depicts a flowchart of an example of a method for channel selection in a system including an IAR.

FIG. 9 depicts a flowchart 900 of an example of a method for channel selection in a system including an IAR. In the example of FIG. 9, the flowchart 900 starts at module 902 with setting metric$_{max}$=0, freq$_{max}$=0, and $f_c$ to a first available carrier frequency.

In the example of FIG. 9, the flowchart 900 continues to module 904 with tuning carrier frequency to $f_c$.

In the example of FIG. 9, the flowchart 900 continues to module 906 with estimating channel and interference covariance matrices. Channel estimates can be obtained by a receiver, for example, during specified "preamble" sections of transmitted signals. An interference covariance estimate can be obtained by a receiver during idle intervals.

In the example of FIG. 9, the flowchart 900 continues to optional module 908 with determining quality of estimates. The module 908 is optional because not all systems will be robustly adaptive. In a robustly adaptive system, the qualities of estimates are determined.

In the example of FIG. 9, the flowchart 900 continues to module 910 with computing a performance metric metric$_{fc}$.

In the example of FIG. 9, the flowchart 900 continues to decision point 918 where it is determined whether metric$_{fc}$ is greater than metric$_{max}$. The determination could also be greater than or equal to, but that would mean additional operations to reset variables to a metric that is equal to the last best; so it would probably be slightly less desirable. If it is determined that the metric$_{fc}$ is greater than metric$_{max}$ (918-Y), then the flowchart 900 continues to module 920 with setting metric$_{max}$ to metric$_{fc}$ and freq$_{max}$ to $f_c$.

After module 920, or if it is determined that metric$_{fc}$ is not greater than metric$_{max}$ (918-N), then the flowchart 900 continues to decision point 922 where it is determined whether additional carrier frequencies are available. If it is determined that additional carrier frequencies are available (922-Y), then the flowchart continues to module 924 where $f_c$ is set to a next available carrier frequency and the flowchart 900 returns to module 904 and continues as described previously.

If, on the other hand, it is determined that no additional carrier frequencies are available, then the flowchart 900 continues to module 926 with tuning carrier frequency to $freq_{max}$ for data communication, and the flowchart 900 ends. In this way, the system can be tuned to the carrier frequency associated with the highest calculated performance metric.

Figure 10:
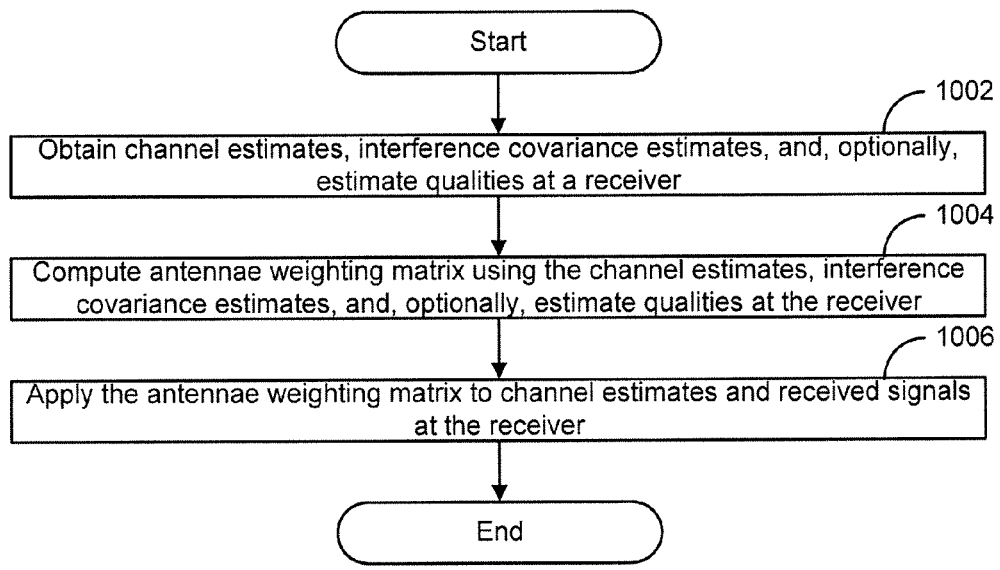
FIG. 10 depicts a flowchart of an example of a method for interference suppression at a receiver.

FIG. 10 depicts a flowchart 1000 of an example of a method for interference suppression at a receiver. In the example of FIG. 10, the flowchart 1000 starts at module 1002 with obtaining channel estimates, interference covariance estimates, and, optionally, estimate qualities at a receiver. In a robust implementation, the optional estimate qualities are obtained.

In the example of FIG. 10, the flowchart 1000 continues to module 1004 with computing antennae weighting matrix using the channel estimates, interference covariance estimates, and, optionally, estimate qualities at the receiver. The antennae weighting matrix can be represented as M.

In the example of FIG. 10, the flowchart 1000 continues to module 1006 with applying the antennae weighting matrix to channel estimates and received signals at the receiver. Then the flowchart 1000 ends. In this way, interference suppression at the receiver can adapt to the quality of the channel and interference covariance estimates. (When applying the antennae weighting matrix, it may be desirable to apply $M^{1/2}$.)

Figure 11:
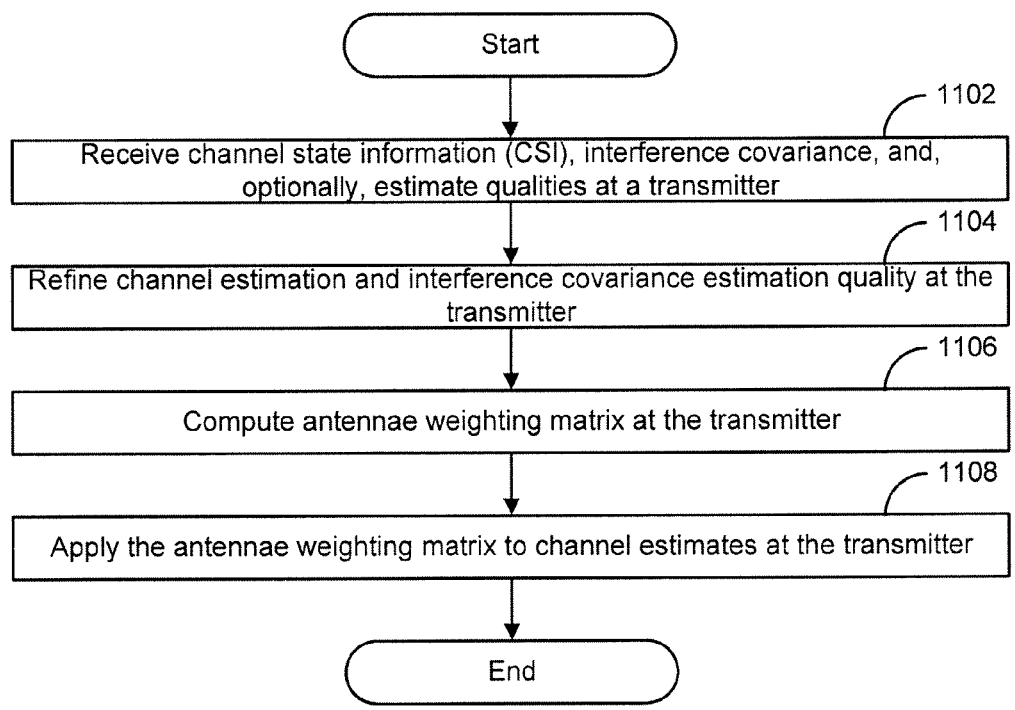
FIG. 11 depicts a flowchart of an example of a method for interference suppression at a transmitter.

FIG. 11 depicts a flowchart 1100 of an example of a method for interference suppression at a transmitter. In the example of FIG. 11, the flowchart 1100 starts at module 1102 with receiving CSI, interference covariance, and, optionally, estimate qualities at a transmitter. In a robust implementation, the optional estimate qualities are obtained. These values could be received, for example, from a receiver.

In the example of FIG. 11, the flowchart 1100 continues to module 1104 with refining channel estimation and interference covariance estimation quality at the transmitter. The qualities of the estimates are refined at the transmitter as appropriate, taking into account factors such as channel time variation, feedback delay, and a limited number of feedback bits.

In the example of FIG. 11, the flowchart 1100 continues to module 1106 with computing antennae weighting matrix at the transmitter. The transmitter can use the channel and interference covariance estimates and their refined qualities to compute the matrix M.

In the example of FIG. 11, the flowchart 1100 continues to module 1108 with applying the antennae weighting matrix to channel estimates at the transmitter. Then the flowchart 1100 ends. In this way, interference suppression at the transmitter can adapt to the quality of the channel and interference covariance estimates.

Figure 12:
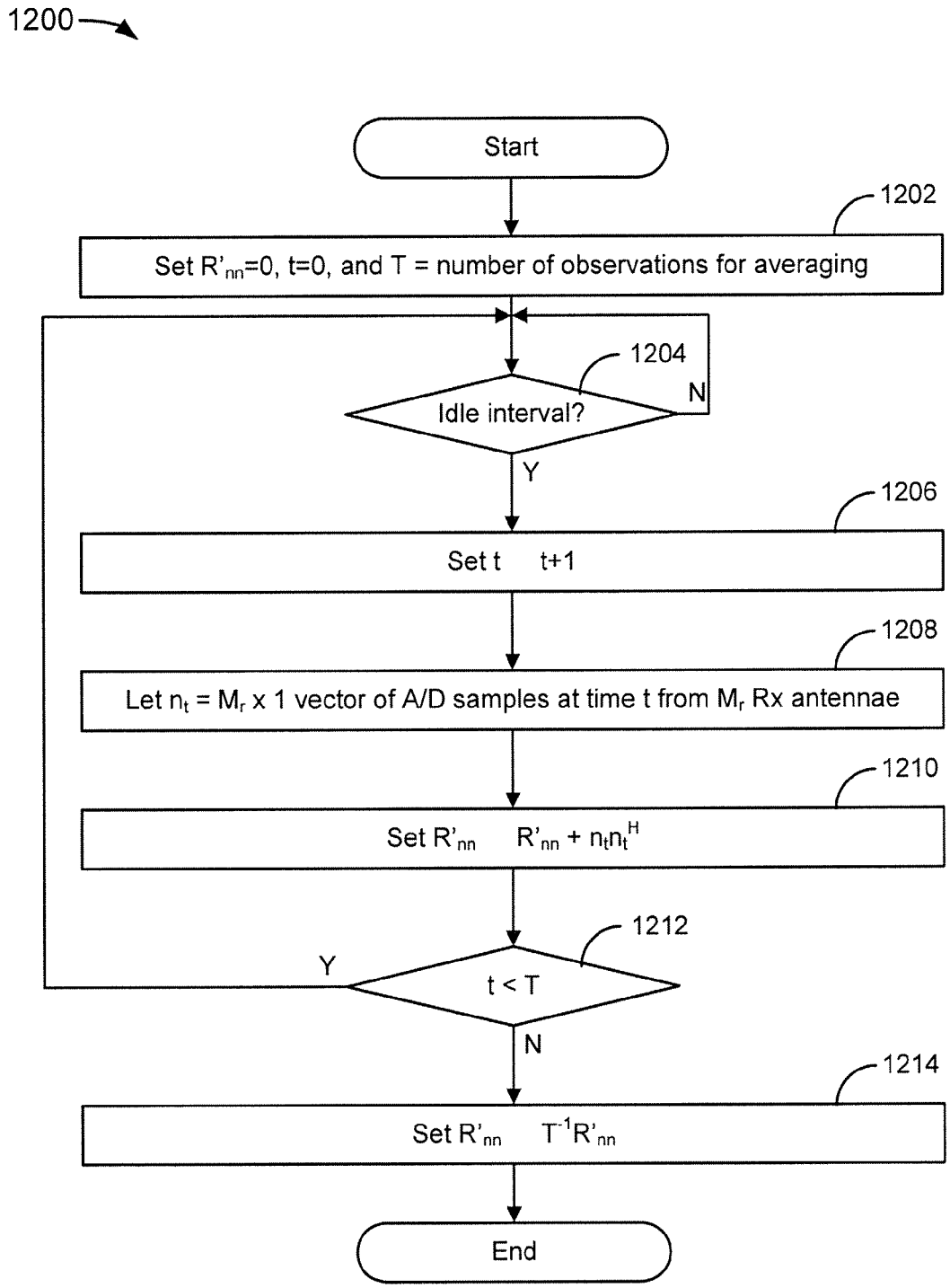
FIG. 12 depicts a flowchart of an example of a method for interference covariance estimation at a receiver.

FIG. 12 depicts a flowchart 1200 of an example of a method for interference covariance estimation at a receiver. In the example of FIG. 12, the flowchart 1200 starts at module 1202 with setting $R'_{nn}=0$, $t=0$, $T=$number of observations for averaging. $R'_{nn}$ is a covariance estimate that is initially set to the $M_r \times M_r$ zero matrix 0. t is a counter.

In the example of FIG. 12, the flowchart 1200 continues to decision point 1204 where it is determined whether the receiver is in an idle interval. If the receiver is not in an idle interval (1204-N), then the flowchart 1200 loops back to decision point 1204 until the receiver is in an idle interval. A receiver can monitor a channel to decide whether the system is idle (e.g., not transmitting or receiving signals). In this way, interference covariance will preferentially be calculated during idle intervals. If the receiver is in an idle interval (1204-Y), then the flowchart 1200 continues to module 1206 where t is incremented. In this way, when an idle interval is detected, a counter is incremented.

In the example of FIG. 12, the flowchart 1200 continues to module 1208 where $n_t$ is set to $M_r \times 1$ vector of A/D samples at time t from $M_r$ Rx antennae. The samples received at time instant t by the $M_r$ A/D converters for Rx antennae are collected into an $M_r \times 1$ vector $n_t$.

In the example of FIG. 12, the flowchart 1200 continues to module 1210 where $R'_{nn}$ is set to $R'_{nn}+n_t n_t^H$. This updates the covariance estimate.

In the example of FIG. 12, the flowchart 1200 continues to decision point 1212 where it is determined whether t is less than T. If it is determined that t is less than T (1212-Y), then the flowchart returns to decision point 1204 and continues as described previously. If, on the other hand, it is determined that t is not less than T (1212-N), then the flowchart 1200 continues to module 1214 where a final covariance estimate is obtained by multiplying the covariance estimate by inverse T: $R'_{nn} \leftarrow T^{-1} R'_{nn}$. An equivalent expression for the covariance estimate is:

$$\hat{R}_{nn} = \frac{1}{T} \sum_{t=1}^{T} n_t n_t^H.$$

Alternatively, a weighted instead of sample average could be used.

Figure 13:
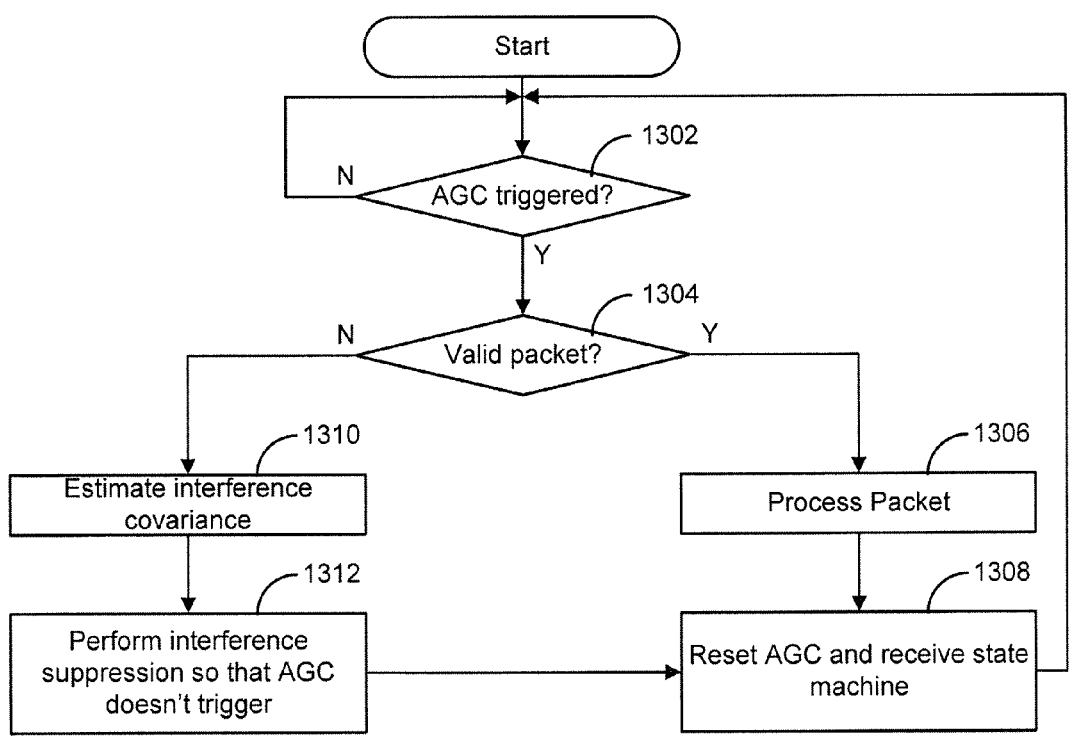
FIG. 13 depicts a flowchart of an example of a method for interference suppression that avoids repeated false triggers of automatic gain control (AGC) at a receiver.

FIG. 13 depicts a flowchart 1300 of an example of a method for interferences suppression that avoids repeated false triggers of automatic gain control (AGC) at a receiver. In the example of FIG. 13, the flowchart 1300 starts at decision point 1302 where it is determined whether an AGC is triggered. If it is determined that the AGC is not triggered (1302-N), then the flowchart 1300 returns to decision point 1302 and loops until the AGC is triggered. Thus, the receiver waits for the AGC to trigger. If, on the other hand, it is determined that the AGC is triggered (1302-Y), then the flowchart 1300 continues to decision point 1304 where it is determined whether a received packet is valid.

If it is determined that a received packet is valid (1304-Y), then the flowchart 1300 continues to module 1306 where the packet is processed. The flowchart 1300 continues to module 1308 where the AGC and receive state machine are reset. Then the flowchart 1300 returns to decision point 1302 and continues as described previously.

If, on the other hand, it is determined that a received packet is not valid (1304-N), then the flowchart 1300 continues to module 1310 where interference covariance is estimated. It may be noted that an "invalid packet" may be interference that was not sent as a packet, but was interpreted as invalid at a receiver. The interference covariance is estimated while the interference that triggered the AGC is still present. The flowchart 1300 continues to module 1312 where interference suppression is performed so that the AGC doesn't trigger. Once a suitable estimate of the interference covariance is obtained, interference suppression is performed, for example, according to any of the techniques described in this document. Then the flowchart 1300 returns to module 1308 and continues as described previously. In this way, invalid packets can be prevented from triggering the AGC.

Depending upon the implementation, configuration, or environmental variables, the modules 1310, 1312 could be done all the time or some of the time. Advantageously, instead of simply discarding invalid packets followed with a reset, interference associated with the source of the invalid packets can be suppressed.

Figure 14:
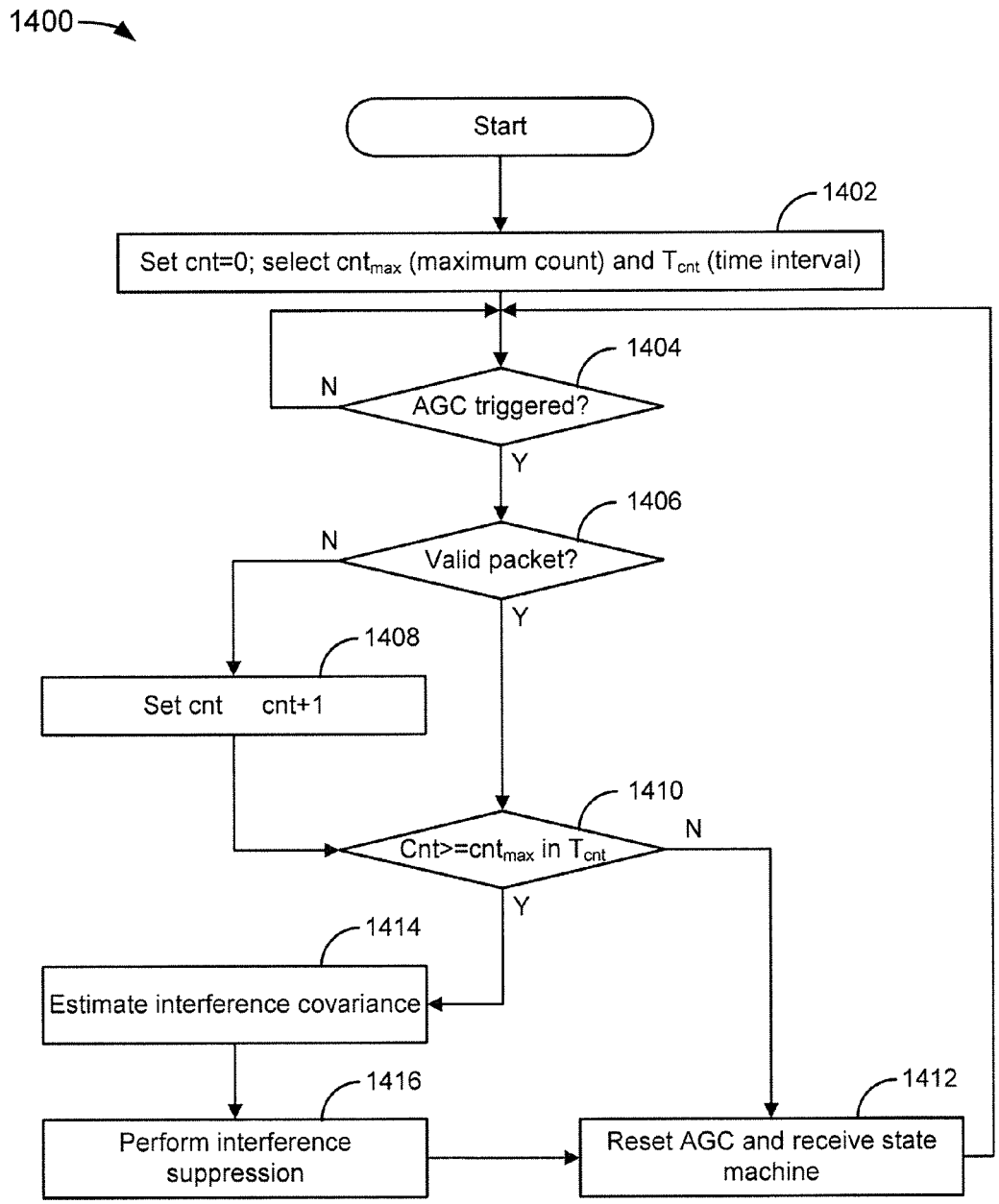
FIG. 14 depicts a flowchart of an example of a method of suppressing intermittent interference.

FIG. 14 depicts a flowchart 1400 of an example of a method of suppressing intermittent interference. In the example of FIG. 14, the flowchart 1400 starts at module 1402 with setting cnt=0 and selecting $cnt_{max}$ and $T_{cnt}$. Cnt is a counter. $Cnt_{max}$ is the maximum count before interference suppression is carried out for intermittent interference. $T_{cnt}$ is the time interval over which the count can be incremented.

In the example of FIG. 14, the flowchart 1400 continues to decision point 1404 where it is determined whether an AGC is triggered. If it is determined that the AGC is not triggered (1404-N), then the flowchart 1400 returns to decision point 1404 and loops until the AGC is triggered. Thus, the receiver waits for the AGC to trigger. If, on the other hand, it is determined that the AGC is triggered (1404-Y), then the flowchart 1400 continues to decision point 1406 where it is determined whether a received packet is valid.

If it is determined that a received packet is not valid (1406-N), then the flowchart 1400 continues to module 1408 where cnt is incremented by 1. Then, or if the received packet is determined to be valid (1406-Y), the flowchart 1400 continues to decision point 1410 where it is determined whether count cnt is greater than or equal to the maximum count threshold $cnt_{max}$ in the time interval $T_{cnt}$.

If it is determined that the count is greater than or equal to the maximum count threshold in the time interval (1410-N), then the flowchart 1400 continues to module 1412 where the AGC and receive state machine are reset, and the flowchart 1400 returns to decision point 1404 and continues as described previously.

If, on the other hand, it is determined that the count is greater than or equal to the maximum count threshold in the time interval (1410-Y), then the flowchart 1400 continues to module 1414 where interference covariance is estimated. The interference covariance is estimated while the interference that triggered the AGC is still present.

In the example of FIG. 14, the flowchart 1400 continues to module 1416 where interference suppression is performed. Once a suitable estimate of the interference covariance is obtained, interference suppression is performed, for example, according to any applicable techniques described in this document.

In the example of FIG. 14, the flowchart 1400 returns to module 1412 and continues as described previously. In this way, intermittent interference can be suppressed by estimating the interference covariance only when the interference is present. It may be noted that the time interval can be reset as desired, which may be based upon implementation, configuration, and/or environmental variables.

Systems described herein may be implemented on any of many possible hardware, firmware, and software systems. Algorithms described herein are implemented in hardware, firmware, and/or software that is implemented in hardware. The specific implementation is not critical to an understanding of the techniques described herein and the claimed subject matter.

As used in this paper, an engine includes a dedicated or shared processor and, hardware, firmware, or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

As used in this paper, the term "embodiment" means an embodiment that serves to illustrate by way of example but not necessarily by limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
    a transmit antennae weighting engine including:
        a weighting matrix computation engine;
        a matrix multiplication engine coupled to the weighting matrix computation engine;
    a precoding engine coupled to the transmit antennae weighting engine;
    an antennae array coupled to the precoding engine;
    wherein, in operation:
    the weighting matrix computation engine has interference covariance feedback from a receiver as input and computes an antennae weighting matrix M using the interference covariance feedback and a performance metric;
    the matrix multiplication engine has channel state information (CSI) as input and computes a modified channel estimate using the CSI and the antennae weighting matrix M;
    the precoding engine has a constellation vector as input and computes a transmit vector using the constellation vector and the modified channel estimate, wherein the transmit vector is associated with data bits mapped onto the constellation vector to be transmitted via the antennae array.

2. The system of claim 1 further comprising:
    a forward error correction (FEC) encoder;
    a buffer coupled to the FEC encoder;
    a plurality of bit interleavers coupled to the buffer;
    a plurality of constellation mappers coupled to the plurality of bit interleavers, wherein the precoding engine is coupled to the plurality of constellation mappers;
    a plurality of digital-to-analog (D/A) converters coupled to the precoding engine;
    a plurality of transmit radio frequency (RF) chains coupled to the plurality of D/A converters, wherein the transmit RF chains are coupled to the antennae array;
    wherein, in operation,
        the FEC encoder encodes data bits into the buffer;
        the bit interleavers interleave the value in the buffer;

the constellation mappers map the result of the bit interleavers to the constellation vector the precoding engine has as input;

the D/A converters convert transmit vector to analog signals;

the transmit RF chains provide the analog signals for transmission on the antennae array.

3. The system of claim 1, wherein the weighting matrix computation engine further has estimation quality feedback from a receiver as input.

4. The system of claim 1, wherein the CSI includes an original channel estimate.

5. The system of claim 1, wherein the transmit antennae weighting engine further includes a performance metric engine that provides the performance metric.

6. The system of claim 5, further comprising a controller, wherein, in operation:

the controller tunes to each of a plurality of carrier frequencies;

the performance metric engine computes performance metrics using channel state information (CSI) and interference covariance information associated with each of the plurality of carrier frequencies;

the controller tunes to the carrier frequency that had the best performance metric for data communication.

7. The system of claim 1, further comprising a controller, wherein, in operation:

the controller determines whether antennae array is, at least in part, idle;

the weighting matrix computation engine computes the matrix M using estimated interference covariance associated with an external device, wherein the matrix M is applied to channel estimates.

8. The system of claim 1, further comprising an interference-adaptive receiver for receiving signals transmitted through the antennae array.

9. The system of claim 1, further comprising a receiver that is not interference adaptive for receiving signals transmitted through the antennae array.

10. A system comprising:

an antennae array;

a receive antennae weighting engine, coupled to the antennae array, including:
a weighting matrix computation engine;
a matrix multiplication engine coupled to the weighting matrix computation engine;
a matrix-vector multiplication engine coupled to the weighting matrix computation engine;

an equalizer coupled to the matrix multiplication engine and the matrix-vector multiplication engine;

wherein, in operation:

the weighting matrix computation engine generates a weighting matrix using an interference covariance metric and a performance metric;

the matrix multiplication engine generates a precoding matrix using a channel estimate and the weighting matrix;

the matrix-vector multiplication engine generates a weighted vector using a received vector and the weighting matrix, wherein the received vector is associated with a transmission received on the antennae array;

the equalizer generates an equalized vector using the precoding matrix and the weighted vector, wherein data bits are derived from the equalized vector.

11. The system of claim 10, further comprising:

a plurality of receive radio frequency (RF) chains coupled to the antennae array;

a plurality of analog-to-digital (A/D) converters coupled to the plurality of receive RF chains and to the matrix-vector multiplication engine;

a plurality of constellation demappers coupled to the equalizer;

a plurality of bit deinterleavers coupled to the plurality of constellation demappers;

a buffer coupled to the plurality of bit deinterleavers;

a forward error correction (FEC) decoder coupled to the buffer;

wherein, in operation, the antennae array provides received analog signals to the receive RF chains;

the A/D converters convert the analog signals into the received vector;

the constellation demappers demap the equalized vector;

the bit deinterleavers deinterleave the result of the constellation demappers into the buffer;

the FEC decoder decodes the value in the buffer to obtain data bits.

12. The system of claim 10, further comprising an interference covariance engine, wherein, in operation, the interference covariance engine provides the interference covariance metric to the weighting matrix computation engine.

13. The system of claim 10, further comprising a channel estimation engine, wherein, in operation, the channel estimation engine provides a modified channel estimate to the matrix multiplication engine.

14. The system of claim 10, further comprising an estimation quality engine coupled to the interference covariance engine, wherein, in operation, the estimation quality engine augments the interference covariance metric.

15. The system of claim 10, further comprising a performance metric engine, wherein, in operation, the performance metric engine provides the performance metric to the weighting matrix computation engine.

16. The system of claim 10, further comprising a controller, wherein, in operation:

the controller tunes to each of a plurality of carrier frequencies;

the performance metric engine computes performance metrics using channel state information (CSI) and interference covariance information associated with each of the plurality of carrier frequencies;

the controller tunes to the carrier frequency that had the best performance metric for data communication.

17. The system of claim 10, further comprising a controller, wherein, in operation:

the controller determines whether antennae array is, at least in part, idle;

updating a covariance estimate using samples gathered while the antennae array is, at least in part, idle, until an observation threshold is reached.

18. The system of claim 10, further comprising a controller, wherein, in operation:

the controller determines whether an automatic gain control (AGC) has been triggered;

when the AGC is triggered:
determining that a packet from a source is not valid;
estimating interference covariance associated with the source;
performing interference suppression so that the AGC does not trigger upon receipt of another invalid packet from the source;
resetting AGC and a receive state machine.

19. The system of claim 10, further comprising a controller, wherein, in operation: the controller determines whether an automatic gain control (AGC) has been triggered;

when the AGC is triggered:
incrementing a count if a packet received from a source is invalid;
if the count reaches a maximum count threshold in a time interval, estimating interference covariance and performing interference suppression so that the AGC does not trigger upon receipt of another invalid packet from the source;
resetting the AGC and a receive state machine.

20. The system of claim 10, further comprising an interference-adaptive transmitter for sending the transmission received on the antennae array.

21. The system of claim 10, further comprising a transmitter that is not interference adaptive for sending the transmission received on the antennae array.

22. A method comprising:
obtaining channel estimates and interference covariance estimates at a receiver;
computing an antennae weighting matrix using the channel estimates and interference covariance estimates at the receiver;
applying the antennae weighting matrix to the channel estimates and received signals at the receiver.

\* \* \* \* \*